United States Patent [19]

Oda et al.

[11] Patent Number: 5,481,984
[45] Date of Patent: Jan. 9, 1996

[54] LEG APPARATUS FOR THE MAGNETICALLY LEVITATED VEHICLE

[75] Inventors: Kazuhiro Oda, Murayama; Hideyuki Takizawa, Kokubunji; Masamichi Yamada, Kobe; Fumio Iwamoto, Takatsuki; Shoji Iwai, Akashi, all of Japan

[73] Assignees: Railway Technical Research Institute, Tokyo; Sumitomo Precision Products Co., Ltd., Amagasaki, both of Japan

[21] Appl. No.: 287,609

[22] Filed: Aug. 9, 1994

Related U.S. Application Data

[63] Continuation of Ser. No. 3,434, Jan. 12, 1993, abandoned.

[30] Foreign Application Priority Data

Mar. 31, 1991 [JP] Japan ................................. 4-108954

[51] Int. Cl.[6] .................................................. B60L 13/06
[52] U.S. Cl. ........................... 104/284; 104/281; 104/247; 105/215.1; 105/180
[58] Field of Search ........................... 104/281, 284, 104/242, 245, 247; 105/215.1, 180; 280/43; 244/102 R, 102 SU; 267/249

[56] References Cited

U.S. PATENT DOCUMENTS

| | | | |
|---|---|---|---|
| 2,931,663 | 4/1960 | Ferand | 267/249 X |
| 2,967,682 | 1/1961 | Fullam et al. | 244/102 R |
| 2,985,479 | 5/1961 | Ortega et al. | 104/245 |
| 3,131,891 | 5/1964 | Lallemant | 244/102 R |
| 3,882,788 | 5/1975 | Simon et al. | 104/281 X |

FOREIGN PATENT DOCUMENTS

| | | | |
|---|---|---|---|
| 38012 | 4/1978 | Japan | 104/284 |
| 4405 | 1/1986 | Japan | 104/281 |
| 63-212165 | 9/1988 | Japan . | |
| 212165 | 9/1988 | Japan . | |
| 4126655 | 4/1992 | Japan | 104/281 |
| 4261305 | 9/1992 | Japan | 104/281 |

*Primary Examiner*—Douglas C. Butler
*Assistant Examiner*—S. Joseph Morano
*Attorney, Agent, or Firm*—Watson, Cole, Grindle & Watson

[57] ABSTRACT

According to this invention, wheels are pivotally supported by a fork arm comprising a lever-type supporting component, an expandable lifting actuator having damper serially arranged to buffer and support thereof at other end end of arm of said supporting component. With this structure, a complete retraction of wheels can be achieved. Hence the supporting component can be used both as the supporting leg apparatus to vertically support the magnetically levitated vehicle and the guide leg apparatus to mechanically guide the vehicle along the guideway side wall. It is, therefore, characterized with the simple structure, light weight, small storage space, and easy to perform maintenance. This invention also discloses the guide leg apparatus in which the stopper ring apparatus guides mechanically the vehicle in place of the guide leg apparatus, when the guide leg apparatus malfunctions or in emergency when magnets are turned off while magnetically levitating at high speed and said leg apparatus mentioned is separately placed. It enables for the guide leg apparatus to retract while levitating and cruising the vehicle magnetically at high speed. Remarkable reduction of running resistance and the running noise as well can be achieved and the storage space for the guide leg apparatus can be smaller with less weight.

6 Claims, 13 Drawing Sheets

LEG APPARATUS FOR THE MAGNETICALLY LEVITATED VEHICLE

This application is a continuation of application Ser. No. 08/003,434, filed Jan. 12, 1993, now abandoned.

BACKGROUND FOR THE INVENTION

This invention is directed to a leg apparatus which can be utilized as a supporting leg to support a magnetically levitated vehicle vertically and as a guide leg to guide mechanically the vehicle along a guideway side wall, and furthermore an improved guide leg apparatus while in turn guides mechanically the vehicle when the magnetically levitated vehicle is not supported the sufficient lateral guide which is levitated by a magnetic force. The invention is more particularly concerned with a leg apparatus in which wheels are supported by a shaft of a fork arm in a lever-type hanger component. An expandable lifting actuator is attached to another arm of said hanger to retract wheels completely, and a damper is provided to said lifting actuator in series acting as a shock buffer, so that the structure of the leg apparatus can be simple and light weight with a small storage space and easy maintenance. The invention is concerned also with a leg apparatus for the magnetically levitated vehicle in which a stopper ring apparatus is separately positioned to guide the vehicle along the guideway side wall in lieu of the guide leg apparatus in a case when the guiding apparatus malfunctions, or in an emergency when the vehicle suddenly loses its magnetic force while levitating at high speed, so that the leg apparatus can be retracted and stored the guide leg of the high speed running vehicle. As a result, the running resistance and noise can be reduced, and a system can be constructed with a compact and light weight structure of the storage space.

With a magnetically levitated vehicle system, the ground coil is arranged on the ground for levitation and propulsion functions and the electrical magnets arranged on the vehicle move by forming a continuously moving magnetic field being corresponded to successive excitation of the propulsion coils. At the same time, by moving electrical magnets on the vehicle, the inductive current is generated in the levitating coil on the ground by which the magnetic field is repulsed, resulting in floating the vehicle.

However, only when the sufficient speed is attained on the vehicle, the inductive magnetic levitating force generates enough power to support the full weight of the vehicle; as a result additional wheels are required to support the vehicle at a low speed cruising.

Such a supporting apparatus with wheels should operate the vehicle comfortably when the vehicle is at rest or at necessitated low speed range; while at high speed, it should be retracted and stored into the vehicle body. Furthermore, when wheels are needed, they should be extended from the vehicle body and a certain mechanism is required to absorb the shock while the wheels are in an extending position.

A prior art leg supporting apparatus employed in a magnetically levitated vehicle (Tokkai-Sho No. 63-212165) disclosed the structure in which wheels were supported by a trailing arm, on which a damper was installed to absorb shocks. Furthermore, a lift cylinder was installed at a pivot side of said damper to retract wheels under actions of lifting the damper and said trailing The aforementioned supporting leg composed of the lifting cylinder, a buffering mechanism, and the trailing arm requires a larger storage space and a longer maintenance time to service many parts at various locations.

Moreover, while the vehicle is at rest or running at low speed, because the lateral guide by magnetic force is not sufficient enough and a directional control is not sufficiently achieved in order to guide the vehicle mechanically rather than magnetically, a pair of the guide leg apparatus that contacts and rotates against the guideway side wail is installed at both sides of the vehicle.

On the magnetically levitated vehicle, in addition to the guide leg, a stopper ring mechanism is provided at both sides of the vehicles to guide the vehicle safely until a full stop position is attained. Said stopper ring mechanism has a two-fold function. Namely, the first function is to absorb the shock which might be generated by touching against the guideway side wall due to the vehicle's malfunctions while travelling at the high speed of 500 km/h. The second function is to withstand the high load of the lateral force of about 8 tons as a result of the contact with the guideway side wall. Hence, it is required that said stopper ring mechanism is equipped with the shock absorbing system that buffers the shocks, and bearings that can withstand the high load and high speed rotational force.

Figure 13A:
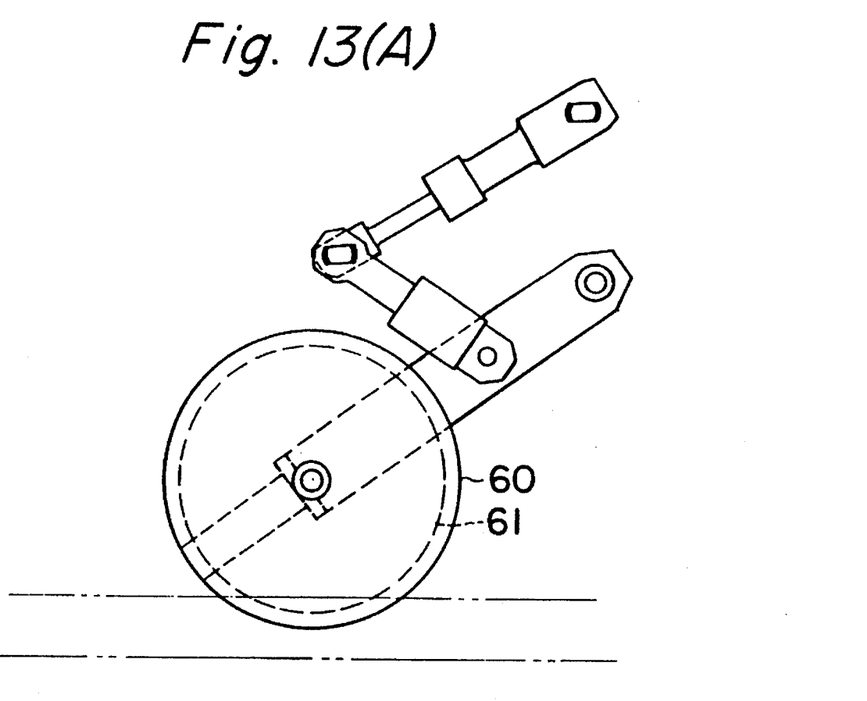
Figure 13B:
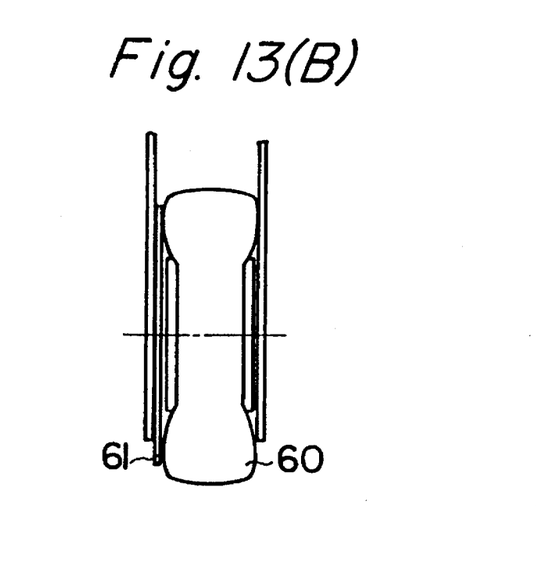

In a conventional type, as seen in FIG. 13, the stopper ring mechanism is assembled in the aforementioned guide leg apparatus on a same shaft sharing with the guide wheel 60. The buffer system also functions as the oleo apparatus to extend and retract the guide legs, and the bearing is axially supported by a single plain bearing at the center of the stopper ring 61.

Since the guide wheel 60 is not needed any more when the vehicle moves at high speed under a magnetically controlled guide, it is desirable that the guide leg apparatus can be retracted into the storage area of a truck to minimize the running resistance and running noise as well.

However, when magnets are in malfunction while the magnetically floated vehicle is cruising, the stopper ring 61 must protect the vehicle from crushing against the guideway side wall, so that a position of the wheel must always be projected from the truck to some extent. Therefore, according to the above structure, the guide wheel 60 can not be retracted while the vehicle is magnetically levitating.

In the conventional type of the guide leg apparatus, being coaxially installed with the stopper ring mechanism, the guide wheel and the stopper ring are installed together on the same shaft. Consequently, the guide wheel cannot be retracted into the storage space of the truck even when the vehicle is magnetically levitating at high speed without the need of mechanical guide through the guide wheel, causing undesired increments in the running resistance and running noise.

Furthermore, when a guide leg system having retracting and extending functions for legs is designed with such a structure that can withstand the high load and high speed running conditions when magnets malfunctions, the guide leg apparatus itself will become heavier. This is a major technical drawback associated with this type of design.

A magnetically levitated vehicle which is intended to be put into practical use in future will have the maximum speed of 550 km/h, and the lateral force at this speed is about 8 tons. Hence, the plain bearing of the conventional type of the stopper ring apparatus will be instantaneously seized and become to be non-operational.

When magnets malfunctions, the lateral force will be generated and the levitating power will be lost, and the vehicle will then gravitate right and left as it drops downward (the distance between the vertical stopper and the rail is about 140 mm), causing contacts of the stopper ring with the guideway side wall.

Namely, the stopper ring does not contact with the side wall perpendicularly, but with about 2 degrees incline, so that once the aforementioned enormous lateral force is generated, a torque around the shaft of the stopper ring will also be generated. Therefore, the stopper ring must have a strength which is high enough to withstand this torque force. From this point of view, the conventional structure cannot withstand this abnormal situation.

OBJECTS AND SUMMARY OF THE INVENTION

It is an object of this invention to provide a leg apparatus that can be used both as a supporting leg apparatus for a magnetically levitated vehicle and a guide leg apparatus that mechanically guides the vehicle along the guideway side wall which improves upon, and avoids the drawbacks of, the leg apparatus of the prior art.

It is a more specific object of this invention to provide a leg apparatus for the magnetically levitated vehicle which adequately performs functions required for a supporting leg and a guide leg, and provides comfortable ride with a light weight simple structure with a small storage place in addition to easy maintenance.

It is another object of this invention to provide a guide leg apparatus for the magnetically levitated vehicle to alleviate the problems in the magnetically levitated vehicles by installing the stopper ring separately from the guide leg apparatus to ascertain the secure operation in case of emergency.

In accordance with an aspect of this invention, the first and second inventions deal with a leg apparatus that can be used both as a supporting leg to support vertically the invented magnetically levitating vehicle and a guide leg to guide the vehicle mechanically along the guideway side wall. The first and second inventions consist only of a lever composed of a fork arm supporting a shaft of wheels and a lifting actuator pivoted to other arm of said lever so that the hanger component can be minimized and can be constructed with a simple structure which enables the structure to be lighter in weight and easy to maintain. Furthermore, the supporting leg can be used both as a supporting leg that supports vertically the vehicle and as a guide leg that guides mechanically the vehicle along the guideway side wall.

According to the first invention, since the wheel can be easily and securely retracted into the shortage space by pushing the lever through the lifting actuator, it would be an advantage that the storage space can be minimized. Moreover when the lifting actuator contracts to cause pulling of the lever, the wheels will be extended and an internal lock mechanism will be activated; subsequently, dampers which are serially connected to said internal lock mechanism will be activated to perform as an excellent shock absorber. A method, by which the dampers absorb shocks during a pulling process, and the structure according to the first invention will not allow the piston to twist.

In the second invention, the wheel is easily and securely retracted in the storage by pulling the lever through the lifting actuator, so that it is advantageous that the storage space can be minimized. Moreover, an internal lock mechanism will be activated during an extending of the wheel by pushing the lever through extending the lifting actuator; subsequently, dampers being serially arranged to said lock mechanism will be activated to absorb the shock effectively. A method by which dampers absorb shocks during a contracting process is also employed in the second invention.

The third invention deals with a guide leg apparatus for the magnetically levitated vehicle. In order to protect the vehicle from contacting a guideway side wall while cruising at high speed, independent of the guide leg apparatus installed at both sides of the wheel, a stopper ring mechanism is provided. The stopper ring mechanism is axially and rotatably supported to a bracket, which is fixed to the truck, through vibroisolating material and bearings positioned at a certain locations. Furthermore, in the third invention, a portion of said stopper ring is projected from the vehicle so that the projected portion of the stopper ring will contact and rotate along a guideway side wall in case of emergency. While levitating the vehicle with the sufficient magnetic floating force and the guiding power, the guide leg apparatus can be retracted into the storage space completely, resulting in a reduction of the running resistance and noise as well. At the same time, it is not necessitated to assume that the guide leg apparatus will be subjected to overload in an emergency, so that the apparatus itself can be lighter and the storage space on the vehicle can be compacted.

Since the stopper ring apparatus according to the third invention buffers the shock which is generated by contacting the magnetically levitated vehicle cruising at 500 km/h with the guideway side wall, as will be described in the Example later, a plurality of bearings installed at the shaft for the stopper ring is fixed through the vibroisolating material to the bracket which is further fixed to the vehicle. Furthermore, bearings and the stopper ring are attached to a bolt through a key, so that they rotate smoothly when the vehicle contacts the guide path.

Moreover, with the stopper ring apparatus according to the third invention, a plurality of bearings is placed on the rotational axis as far apart as possible to reduce the bearing load, in order to withstand the enormous lateral load at a high speed. It is also designed in such a way that the apparatus can withstand the torque action which results from the lateral inclination. Since the shock absorbing material will be subjected to damages when the stopper ring inclines too greatly, the incline allowable limit is set by the incline limit tab.

The above and many other objects, features, and advantages of this invention will be more fully understood from the ensuing description of a preferred embodiment of the invention, which is to be read in connection with the accompanying drawings.

BRIEF DESCRIPTION OF DRAWINGS

FIG. 13A is an illustration which shows a stop view of the conventional type of the stopper ring's structure and the guide leg apparatus for the magnetically levitated vehicle, while FIG. 13B is another illustration which shows a frontal view of FIG. 13A, wherein 1 ... wheel,
2 ... wheel shaft,
4 ... railbed,
5 ... side wall,
6 ... guide wheel,
7, 40 ... bracket,
10 ... lever,
11 ... fork arm,
12 ... lever arm,
13 ... pivot component,
20 ... lifting actuator,
21 ... barrel cam,
22 ... lock guide,
24 ... piston cylinder,
25 ... lifting rod,
26 ... lifting head,
27 ... lock segment,
28 ... lock piston,
29 ... spring,
30 ... damper,
31 ... damper rod,
33 ... free piston,
34 ... high pressure piston,
35 ... end cap,
36 ... orifice,
37,38 ... metal bellows,
41 ... fork,
41 ... stopper ring,
50 ... measurement rod,
51,52 ... ring band,
53 ... indicator,
54 ... supporting base,
55 ... supporting fixture,
70 ... limit switch,
71 ... claw,
80 ... shaft supporting component,
81 ... bolt,
82 ... ball beatings,
53,83 ... vibroisolating material,
84 ... key, and
85 ... incline stop tab.

DETAILED DESCRIPTION OF THE PREFERRED EMBODIMENT

EXAMPLE 1

Figure 1:
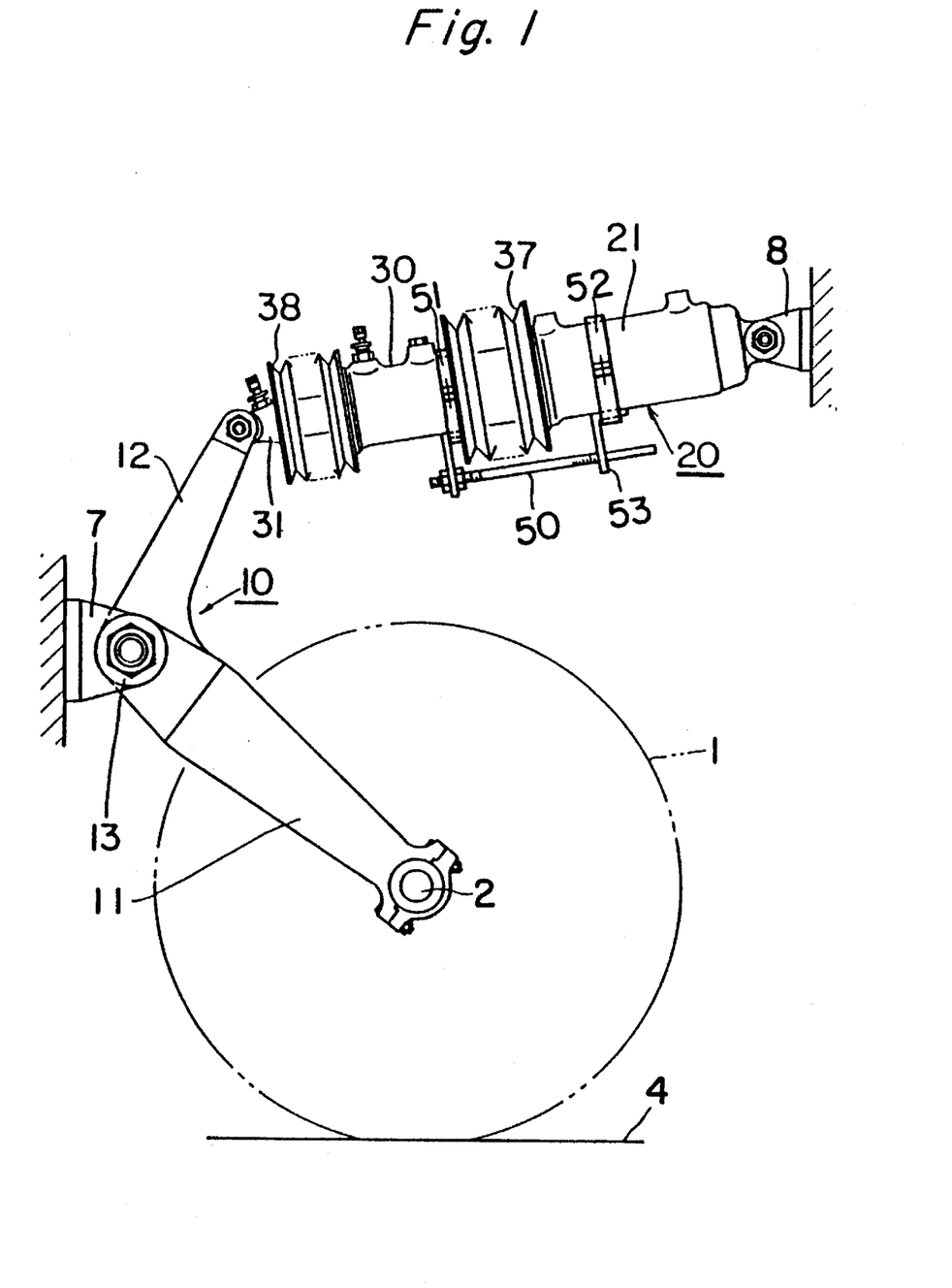
FIG. 1 is an illustration showing a side view of the supporting leg apparatus for the magnetically levitated vehicle according to one preferred embodiment of this invention.
Figure 2:
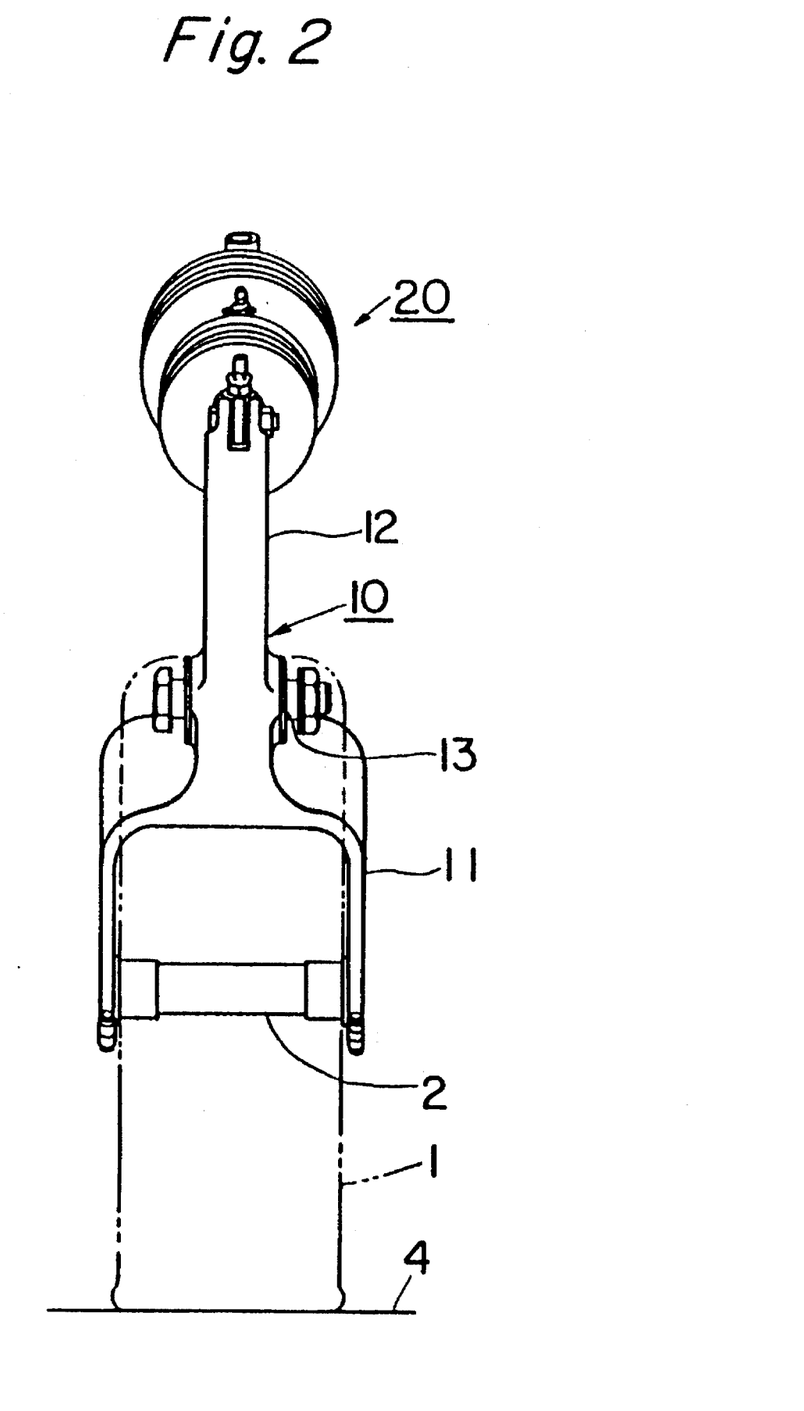
FIG. 2 is an illustration showing a rear view of the supporting leg apparatus of said vehicle in FIG. 1.

A supporting leg apparatus according to this invention consists of a lifting actuator 20 which has an internal lock mechanism with a lever 10 and a damper 30 that are serially arranged.

The lever 10 is supported through a bracket 7 at a pivot component 13 of the vehicle, and consists of a fork arm 11 to support a wheel shaft 2 of a wheel 1 and a lever arm 12 which extends and retracts itself and transfer the shock to the wheel 1.

Furthermore, at a distal end of the lever arm 12, a damper rod 31 of the lifting actuator 20 is axially supported on said lifting actuator 20. A barrel cam 21 is axially supported to the vehicle through a bracket 8.

Figure 3:
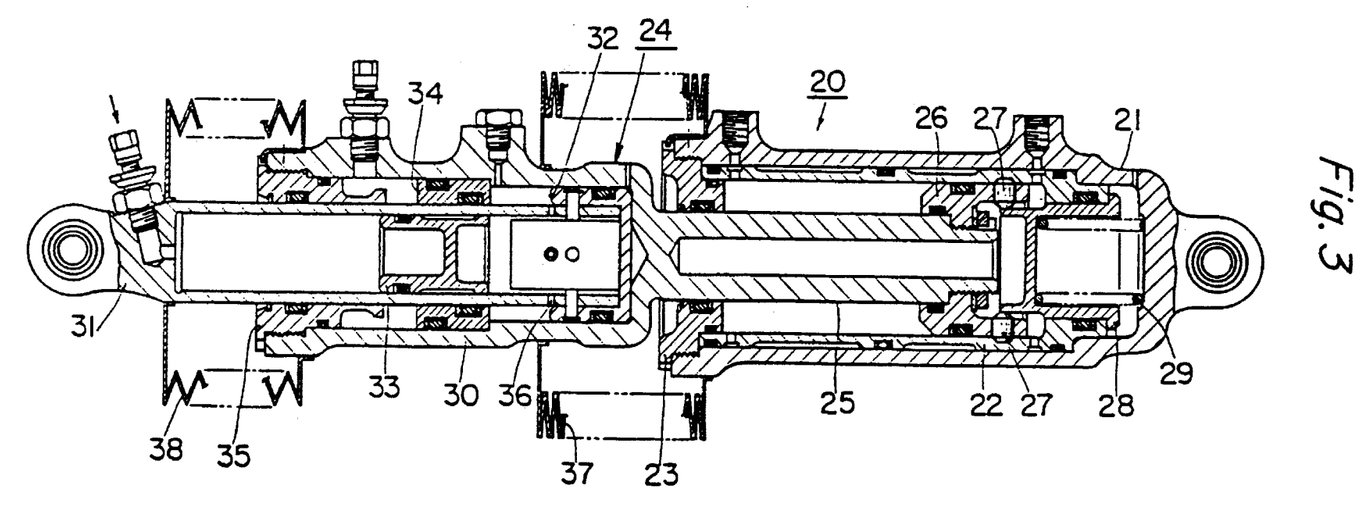
FIG. 3 is an illustration which shows a longitudinal sectional view of the lifting actuator with a damper of the supporting leg apparatus in FIG. 1.

On the lifting actuator 20, the other end of a piston cylinder 24 to which a lifting rod 25 is arranged within the barrel cam 21 axially supported to the wheel forms the damper cylinder 30. The damper rod 31 is further engaged to the damper cylinder 30.

At a distal end of the lifting rod 25 of the piston cylinder 24, a piston head 26 which internally contains a lock segment 27 is installed. The piston head 26 is inserted into a sleeve-type lock guide 22 which is engaged in the barrel cam 21 and secured by an end cap 23. The piston head 26 is facing against a lock piston 28 whose path is defined by an end of a lock guide 22 and an inner end of the barrel cam 21. Said lock piston 28 is reinforced by a spring 29. A required mount of pressure oil is introduced into a front and back sides of the aforementioned piston head 26.

Inside the damper cylinder 30 of the piston cylinder 24, the damper rod 31 is inserted and sealed by an end cap 35. Said damper rod 31 has a piston head 32 at its distal end and installed by a free high pressure piston 34 on its outer periphery. A free piston 33 is inserted inside the damper rod 31.

The high pressure piston 34 and the free piston 33 are pressed by means of pressurized air, and faced against a pressurized oil which passes through between the piston head 32 and the high pressure piston 34 and through an orifice 36, and is trapped within the damper rod 31.

With the supporting leg apparatus having a structure as described above according to this invention, in order to store the wheel 1, the damper rod 31 penetrates into the damper cylinder 30 and reaches the bottom to push the lever arm 12, resulting in retracting the fork arm 11.

By contracting the lifting rod 25, the damper rod 31 will also be contracted while the lever arm 12 is pulled out. Hence the fork arm 11 is extended, a lock segment 27 is engaged in a hole portion of the lock guide 22 and locked by the lock piston 28. The damper rod 31 is successively extended with a required length for the wheel 1 to reach the ground. An input force caused by the vertical movement of the wheel 1 will be transferred to the damper rod 31 through the lever 10 to buffer the shock and support the wheel, performing an excellent shock absorbing ability.

Since the lever 10 is employed for the main supporting portion of this invented supporting leg apparatus for the apparatus to be lighter in weight, this can be achieved by choosing the material from, for example, aluminum-based alloys or titanium-based alloys.

Metal bellows 37,38 which can seal an operating zone of the lifting rod 25 and the damper rod 31 are provided, as seen in FIG. 3, between the barrel cam 21 of the lifting actuator utilized for this invented leg supporting apparatus and the damper cylinder 30, and also between the damper cylinder 30 and damper rod 31 in order to protect functional components including piston rods or the like. Hence problems associated with conventional types such as a degradation due to weather factors recognized with cloth boots and damages of the functional components by foreign bodies can be prevented. Therefore, a reliability of the supporting leg apparatus is enhanced.

Furthermore, a measurement rod 50 is fixed by a ring band 51 facing toward the barrel cam 21 in parallel to the outer circumference of the damper cylinder 30 which is an extending and retracting side of the lifting actuator 20. An indicator 53 is fixed by a ring band 52 on a pre-determined position of the outer periphery of the barrel cam 21. By examining the relative position of the measurement observed on the measurement rod 50 and the indicator 53, an operating condition of an internal lock mechanism of the lifting actuator 20 can be monitored and inspected through a lock check meter. Hence a visual inspection on operational conditions of the lifting actuator can be achieved with an extreme easiness.

EXAMPLE 2

Figure 4:
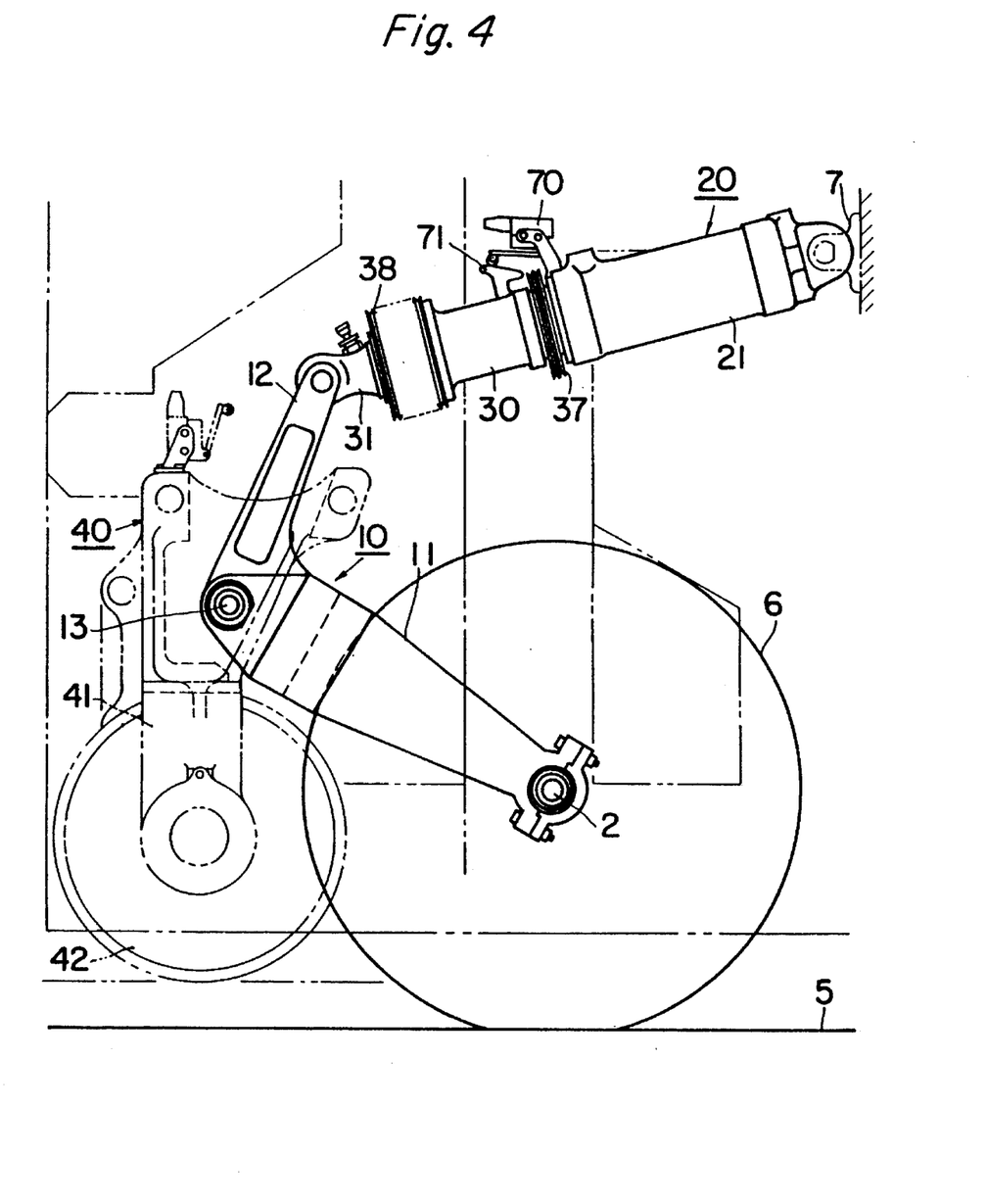
FIG. 4 is an illustration showing a top view of the guide leg apparatus for the magnetically levitated vehicle according to one embodiment of this invention.

While the wheel 1 is extended to a railbed 4, according to the supporting leg apparatus of the previous Example 1, the guide leg apparatus illustrated in FIG. 4 discloses so that the wheel is installed at both sides of a truck of the train when the magnetic guide force for levitating the vehicle magnetically is not strong enough, in order to guide the vehicle mechanically in lieu of the magnetic force. Using the exact same structure as employed in Example 1, a guide wheel 6 is extended laterally to contact against a formed guideway side wall 5 and to guide the vehicle and buffers the shock. When it is not needed it will be retracted and stored within the truck.

For further explanation of this structure in details, the lever 10 is arranged horizontally and is axially supported at its pivot portion through the bracket to the truck. It includes further the fork arm 11 to support axially the wheel shaft 2 of the guide wheel 6 and the lever arm 12 to transfer the lifting movement and the shock from the guide wheel 6. Moreover, at a distal end of the lever arm 12, the damper rod 31 of the lifting actuator 20, in which the barrel cam 21 is axially supported to the truck through the bracket 7, is pivotally supported.

Therefore, performances of the lever 10 being pivoted to the guide wheel 6 and the lifting actuator 20 connected thereto are exactly identical to those described in Example 1.

Furthermore, FIG. 4 illustrates an example of the stopper wheel apparatus in which a stopper ring 42 is rotatably pivoted through a vibroisolating material to a fork arm 41 at a distal end of a bracket 40 which extends across said pivot portion 13 and fastened to the truck. A portion of the stopper wheel 42 is always projected from the truck.

When a malfunction occurs with magnets while the vehicle is floating and running at high speed, magnets will lose their magnetic force instantaneously. Hence, default region will fall down and will be simultaneously pushed against the guideway side wall 5 by a repulsive force caused by opposite side magnets. In order to protect the vehicle, the stopper wheel 42 will contact the side wall 5 and to guide laterally the vehicle until the vehicle stops.

Furthermore, a claw 71 is projected at the outer circumference of the damper cylinder 30 of the lifting actuator 20, and a limit switch 70 is provided at a distal end of the barrel cam 21. When the internal lock mechanism is completed by engaging the lifting rod 25 of the piston cylinder 24 to the barrel cam 21, the claw 71 will contact the limit switch 70; thus a completion of the internal locking can be monitored.

EXAMPLE 3

Figure 5:
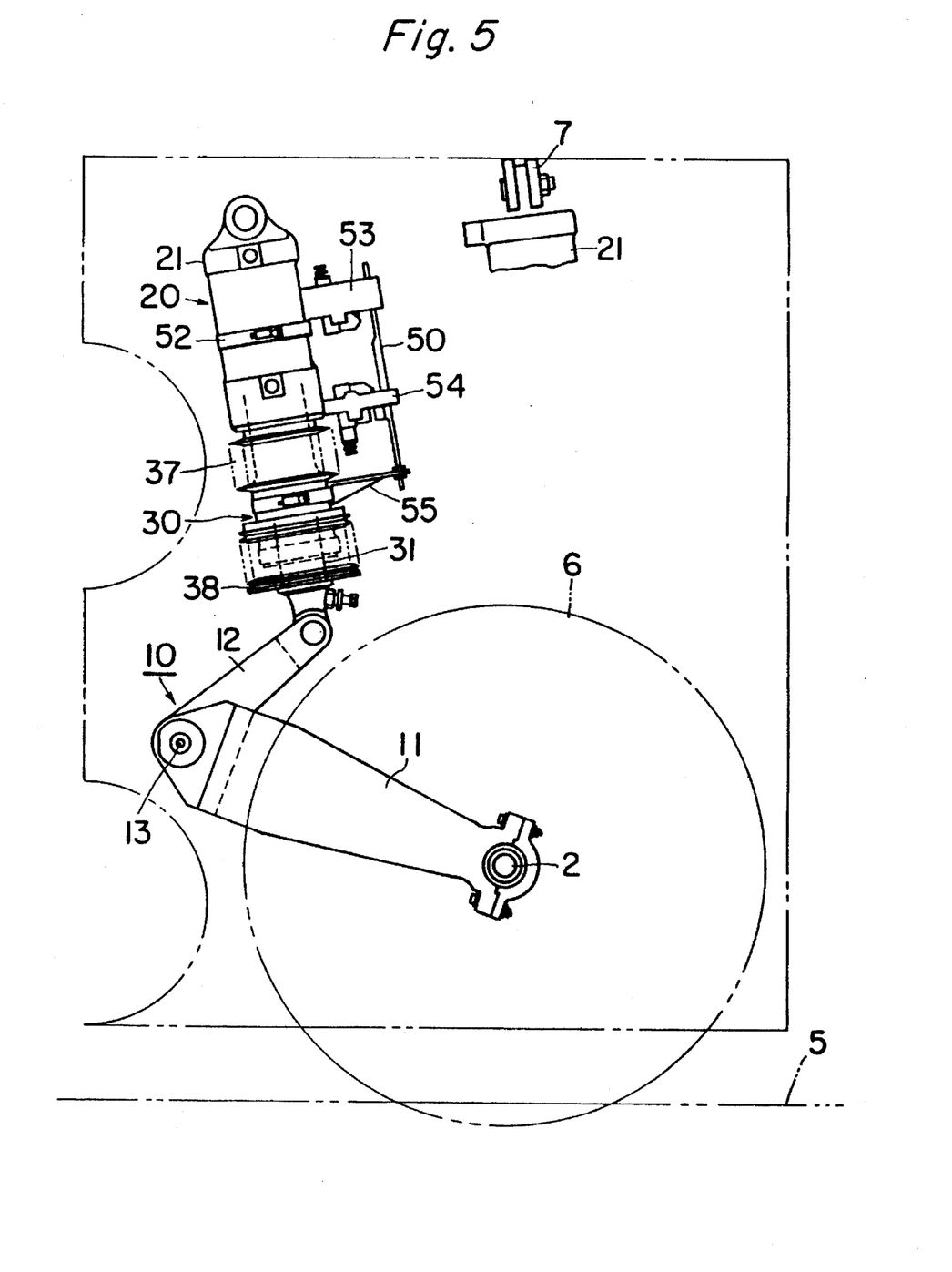
FIG. 5 is an illustration which shows a side view of the guide leg apparatus for said magnetically levitated vehicle according to this invention.
Figure 6:
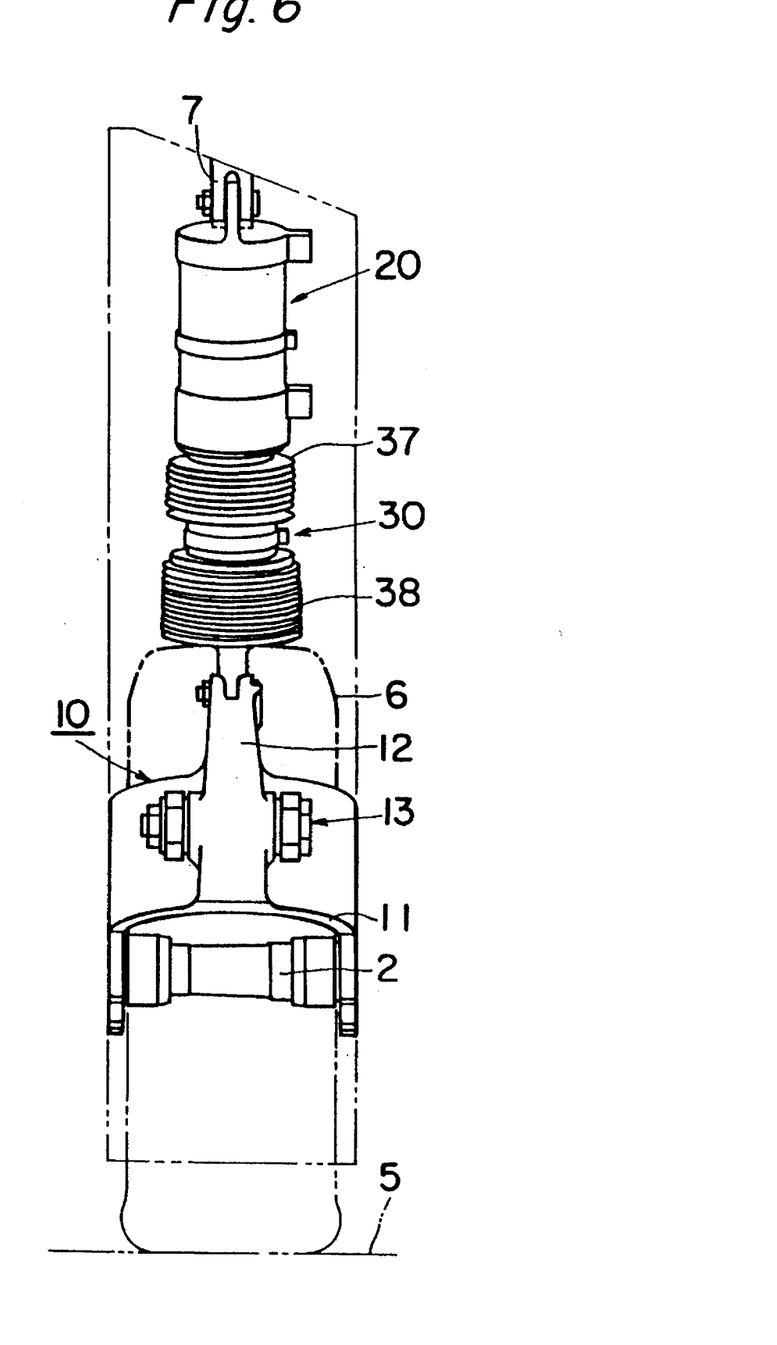
FIG. 6 is an illustration showing a frontal view of the guide leg apparatus of FIG. 5.

Although the leg supporting apparatus shown in FIG. 5 can be used either as the supporting leg or as the guide leg, a case it is utilized as a guide leg apparatus will be described here. Namely, the guide leg apparatus is installed at both sides of the truck of the vehicle to guide mechanically the vehicle when the magnetic force is not sufficiently enough. The guide wheel 1 extends horizontally against the constructed guideway side wall 5 and contacts therewith to guide the vehicle and buffer the shock. When it is not in use, it will be retracted and stored within the truck.

The guide leg apparatus, according to this invention, is constructed with the lever 10 and the lifting actuator 20 having the internal lock system with dampers 30 arranged in a serial way.

The lever 10 is horizontally placed, and is axially supported to the truck at the pivot portion 13 through the bracket (not shown). Said lever 10 consists of the fork arm 11 to pivot the wheel shaft 2 of the guide wheel 1 and the lever arm 12 to transfer the extension and retract movement, and shock caused by the guide wheel 1.

Furthermore, at a distal end of the lever arm 12, the damper rod 31 of the lifting actuator 20, in which the barrel cam 21 is pivoted to the truck through the bracket 7, is axially connected.

Figure 7:
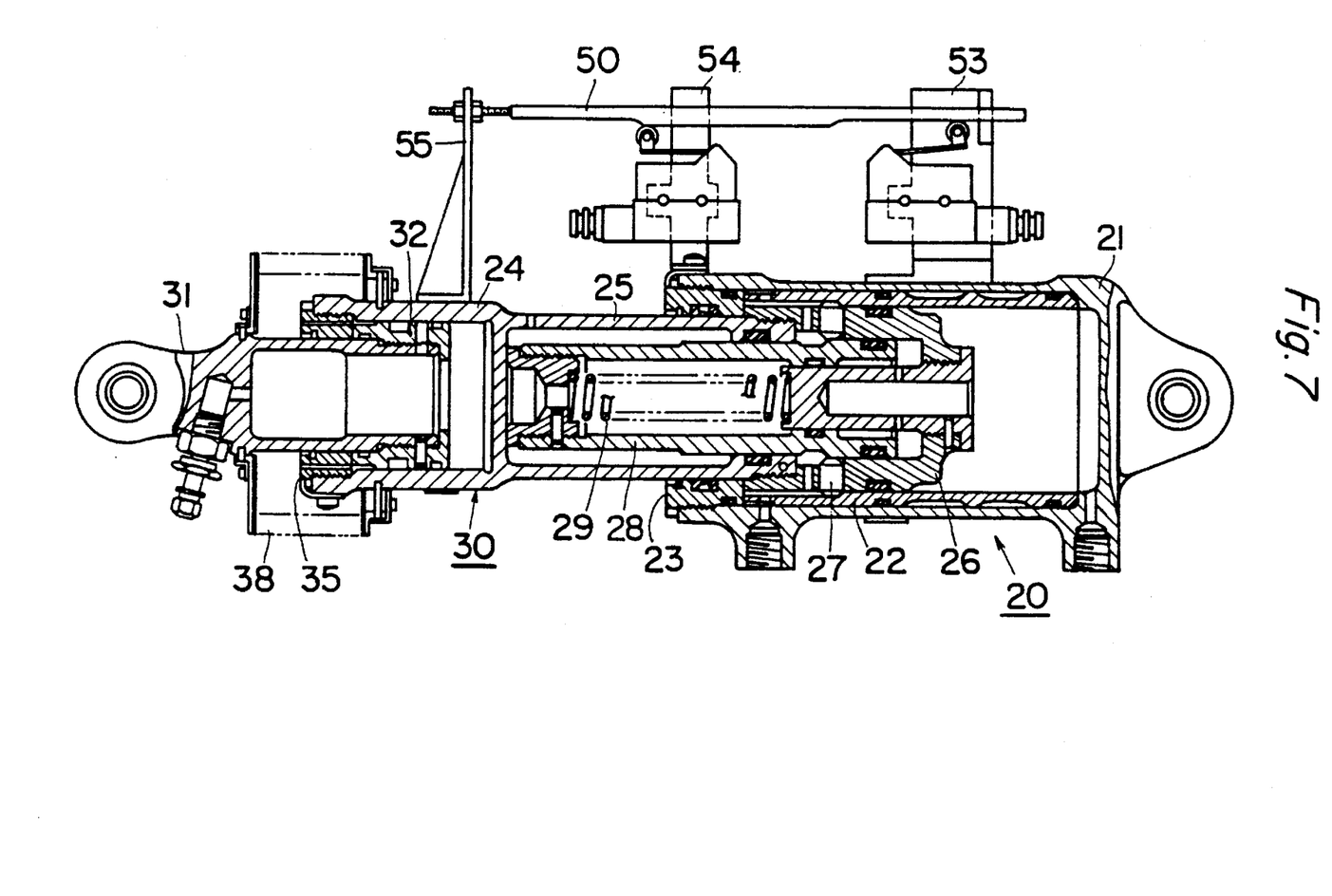
FIG. 7 is an illustration which shows a longitudinal sectional view of the lifting actuator with a damper of the guide leg apparatus in FIG. 5.

In the lifting actuator 20, as seen in FIG. 7, the other end of the piston cylinder 24 engaging the lifting rod 25 inside the barrel cam 21 which pivots to the vehicle truck on the pivot portion side 13 forms the damper cylinder 30. The damper rod 31 is engaged therein.

At a distal end of the lifting rod 25 of the piston cylinder 24, a piston head 26 which contains internally the lock segment 27 is installed, and is installed into the sleeve-shaped lock guide 22 which is engaged in the barrel cam 21 and fitted at the end cap 23. The piston head 26 faces against the lock piston 28 whose travelling path is defined by inner end of the lifting rod 25 and inner end of the piston head 26. Said piston head 26 is further reinforced by the spring 29. A required amount of pressure oil is then introduced to the front and back sides of said piston head 26.

Inside the damper cylinder 30 of the piston cylinder 24, the damper rod 31 having the piston head 32 installed at its distal end is inserted and sealed with the end cap 35.

The piston head 32 and the damper rod 31 are pushed by pressurized air, and the shock caused from outside will be buffered by means of compressing the pressurized air between the inner end of the damper cylinder 30 and the piston head 32.

Figure 8:
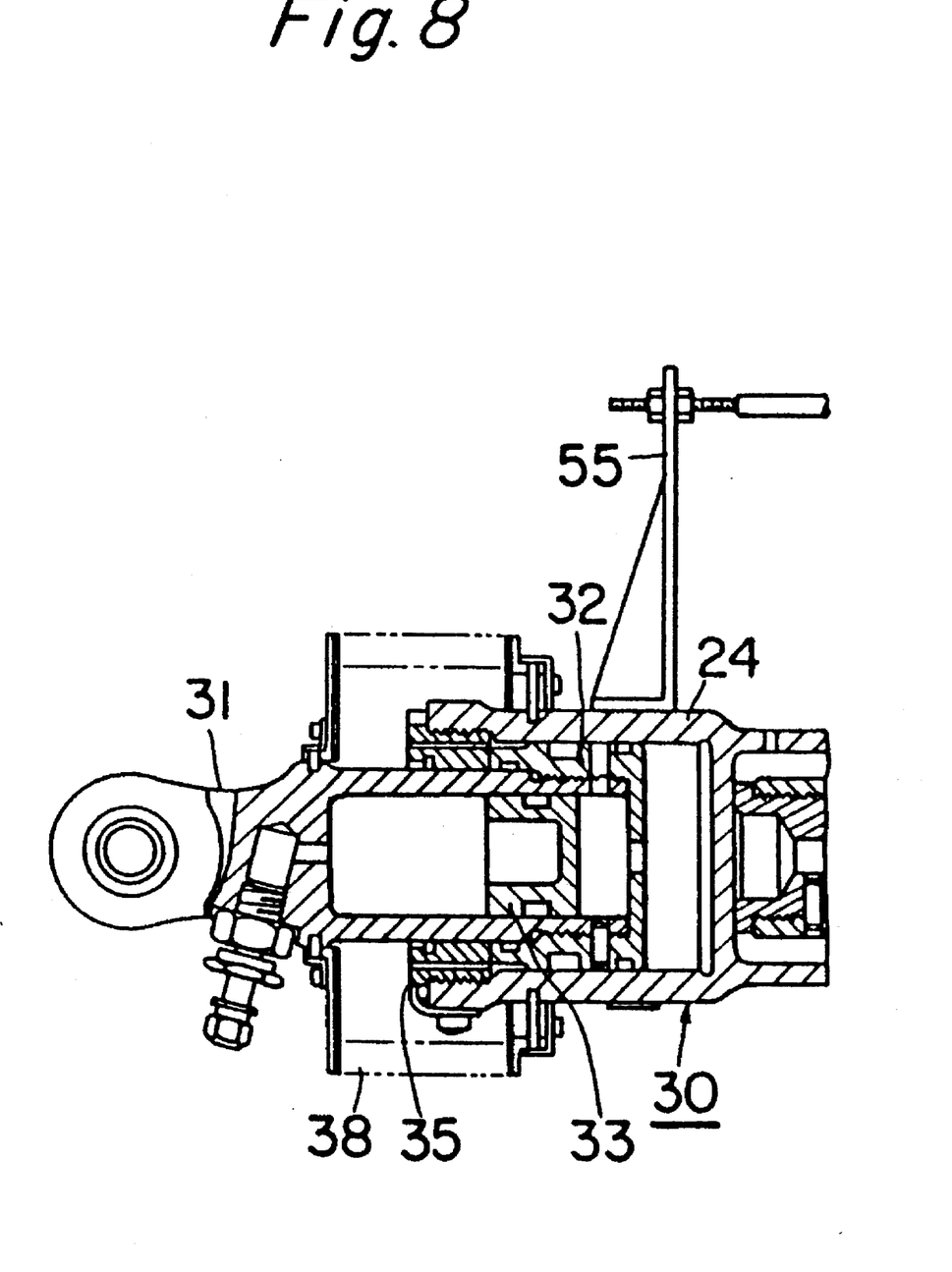
FIG. 8 is an illustration which shows a longitudinal view of vital parts which shows a structure of the other damper in the guide leg apparatus according to one embodiment of this invention.

In place of the damper structure utilizing the pressurized air, as mentioned in FIG. 7, the free piston 33 is engaged in the damper rod 31 of the damper cylinder 30, as seen in FIG. 8. Another structure can be constructed in which the damper cylinder 30 is sealed with oil while the damper rod 31 is filled with air. An orifice is provided at the right side wall of the piston head 32. Hence the damping can be achieved by both oil and air media.

With the aforementioned structure of the guide leg apparatus, in order to retract the guide wheel 1, the damper rod 31 along with the lifting rod 25 penetrates into the barrel cam 21 and touches the bottom to pull the lever arm 12 and retract the fork arm 11 by contracting the lifting rod 25.

By extending the lifting rod 25, the damper rod 31 will also extend and push the lever arm 12. When the fork arm 11 is pushed out, the lock segment 27 engages to a hole of the lock guide 22 and is locked by the lock piston 28. Subsequently, the damper rod 31 contracts with a required length and the guide wheel 1 will touch the side wall. Input force generated, for example, by the lateral movement of the guide wheel 1 is transferred through the lever 10 to the damper rod 31 to buffer the shock, resulting in an excellent shock absorbing performance.

Metal bellows 37,38 which can seal an operating zone of the lifting rod 25 and the damper rod 31 are provided, as seen in FIG. 7, between the barrel cam 21 of the lifting actuator utilized for this invented leg supporting apparatus and the damper cylinder 30, and also between the damper cylinder 30 and damper rod 31 in order to protect functional components including piston rods or the like. Hence problems associated with conventional types such as a degradation due to weather factors recognized with cloth boots and damages of the functional components by foreign bodies can be prevented. Therefore, a reliability of the supporting leg apparatus is enhanced.

Furthermore, as shown in FIG. 7, one end of the measurement rod 50 is secured by a support fixture 55 in parallel to an outer circumference of the damper cylinder 30 which is an expandable side of the lifting actuator 20 and toward the barrel cam 21. The other end of the measurement rod 50 is inserted into support bases 53,54 having two through-holes placed on certain positions on the outer circumference of the barrel cam 21. For example, by installing an indicator on the support base 53, 54 at end side of the barrel cam 21 the relative position of the scale inserted on the measurement rod 50 with respect to the indicator can be used to monitor the operational condition of the internal lock mechanism of the lifting actuator 20 through the lock check meter. Hence it becomes extremely easy to inspect the operational condition of the lifting actuator 20.

A copying surface with the required shape is provided at the measurement rod 50. By copying a copying roller of a copying switch installed inside the support bases 53,54, it is possible to automate the oil pressure control for retraction legs through a contracted condition of the lifting rod 25.

Although the above example has been described for a case of the guide leg apparatus, if said apparatus is inserted to the truck at the bottom portion of the vehicle, in order to lift and lower the wheel to the rail bed, it will function similarly as the supporting leg apparatus for the magnetically levitated vehicle.

EXAMPLE 4

Figure 9:
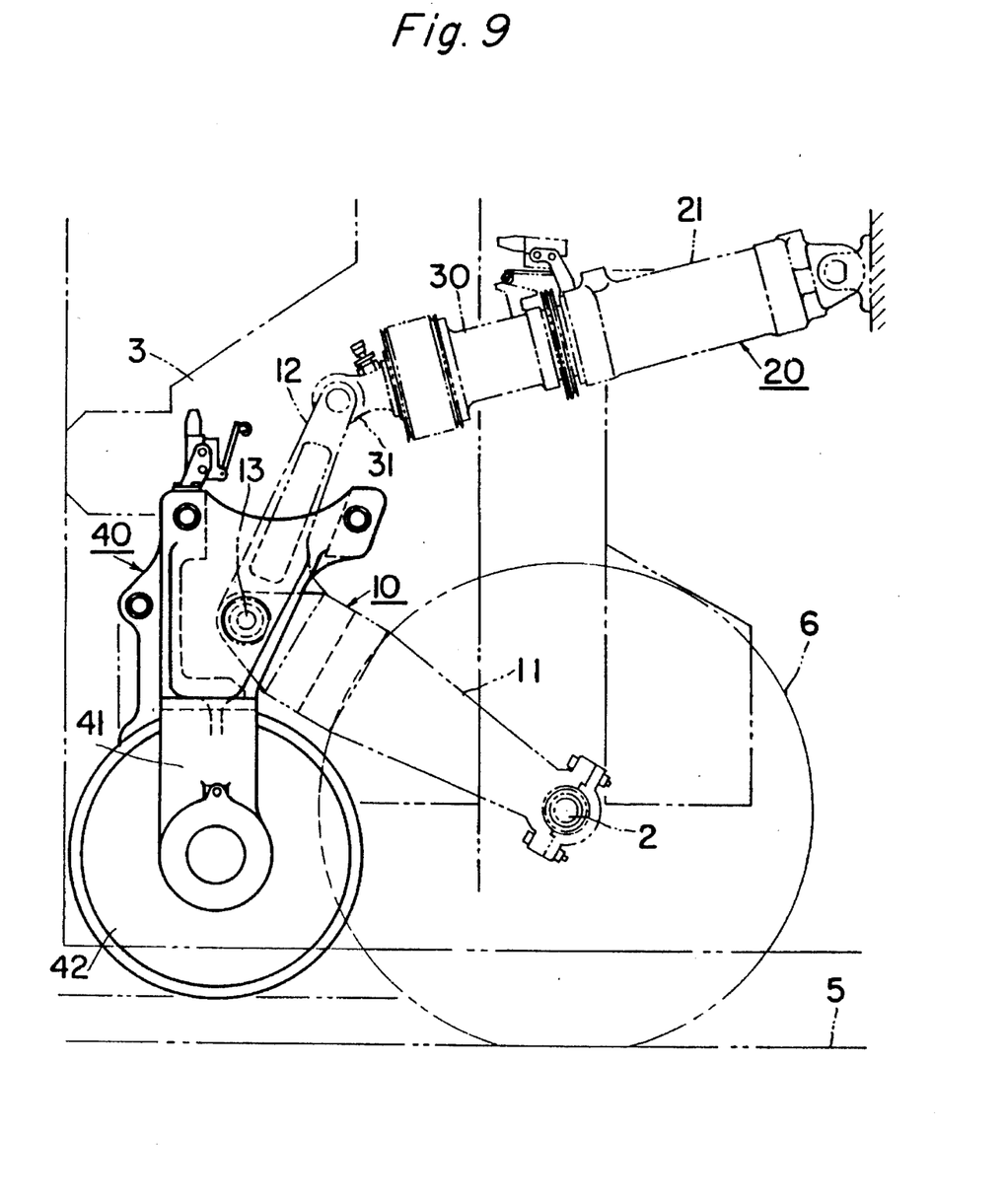
FIG. 9 is an illustration showing a top view of a stopper ring's structure and the guide leg apparatus for the magnetically levitated vehicle of this embodiment.

The guide leg apparatus shown in FIG. 9, as described in FIG. 4, consists of the lifting actuator 20 having an internal lock mechanism with the lever 10 and dampers serially arranged.

The lever 20 is pivotally supported to the truck 3 at the pivot portion 13 through the bracket. It consists of the fork arm 11 to support axially the shaft 2 of the guide leg tire and the lever arm 12 to lift, lower and transfer the shock of the guide wheel 1.

Furthermore, at a distal end of the lever arm 12, the damper rod 31 of the lifting actuator 20 in which the barrel cam 21 axially supported by the vehicle is pivotally supported.

By lifting actuator 20, one end of the piston cylinder whose other end is engaged to the lifting rod forms the damper cylinder 30 inside the barrel cam 21 pivoting the wheel. Said damper rod 31 is further engaged thereto.

Figure 10:
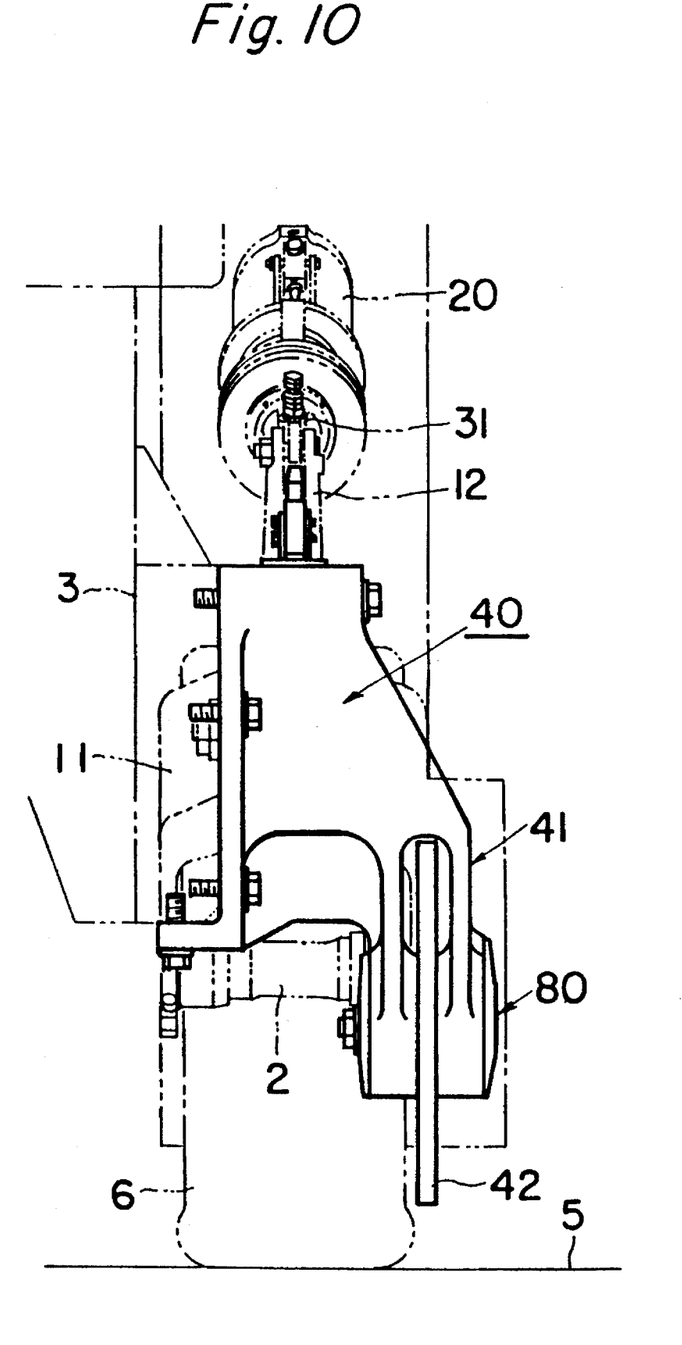
FIG. 10 is an illustration which shows a frontal view of the stopper ring's structure and the guide leg apparatus for the magnetically levitated vehicle of this embodiment.

The support ring apparatus according to this invention, as shown in FIGS. 9 and 10, supports pivotally and rotatably the stopper ring 42 through vibroisolating material 53 to a distal end of the fork arm 41 of the bracket 40 which passes across the pivot portion 13 and is fixed to the wheel.

Figure 11:
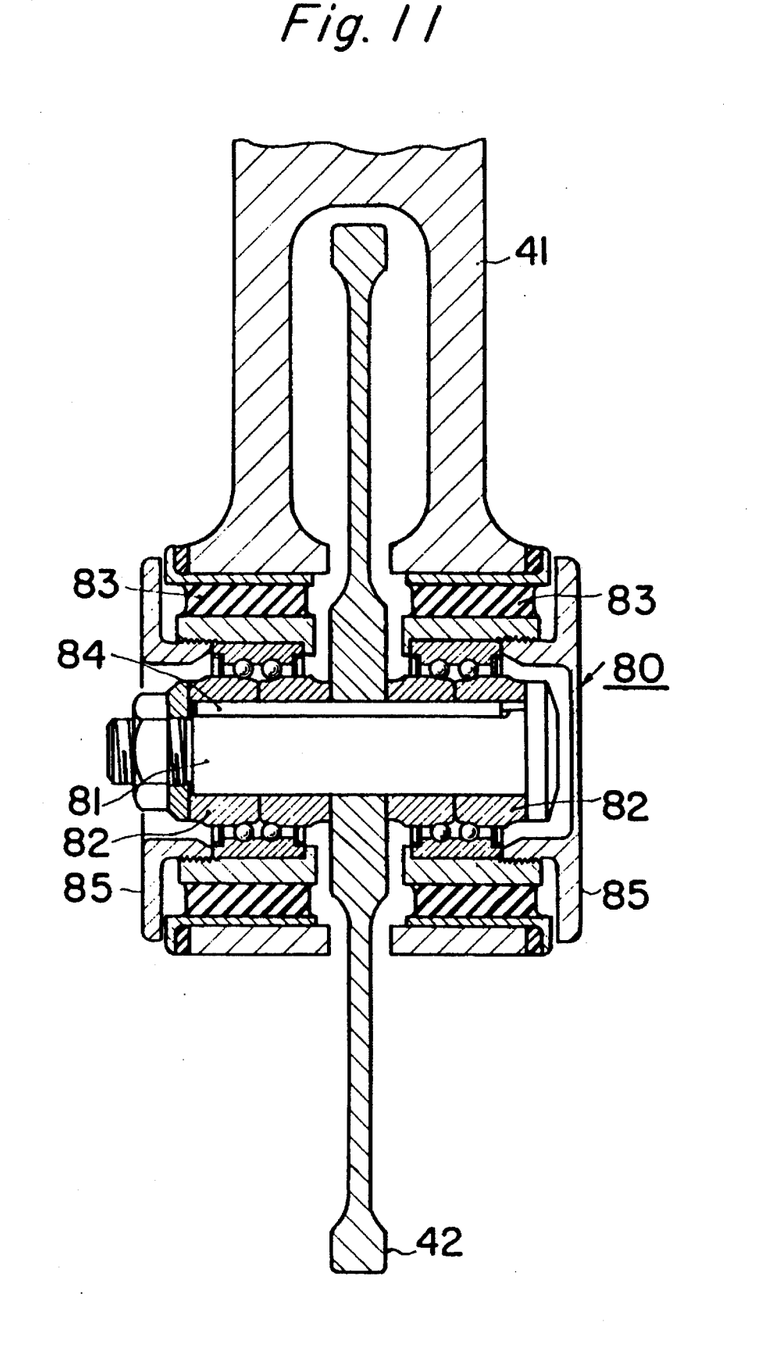
FIG. 11 is an illustration which shows a longitudinal view of main parts of the stopper ring apparatus for the magnetically levitated vehicle according to one embodiment of this invention.

Therefore, as shown in FIG. 11, at a shaft supporting component 80 of the fork 41, ball bearings 82 which axially support a bolt 81 of the stopper ring 42 are secured to the fork 41 through a vibroisolating material 83.

At the above secured position, the stopper wheel 42 and the inner lace of two ball bearings 82 attached to both sides thereof are engaged to the bolt 81 through a key 84.

A distance between two ball bearings 82 is arranged as long as possible on the same shaft and the structure is designed in such a way that it will withstand the high torque action resulting from the load incline. Furthermore, to prevent excessive inclination of the stopper ring 42, the inclination of the bolt 81 is controlled by screw-tightening an incline stop tab 85 to the shaft supporting component 80. Said incline stop tab 85 consists of the cap component with an inclination tolerance of the gap between a flange and fork 41.

Furthermore, the bracket 40 is adjusted in such a way that a portion of the stopper ring 42 will always be projecting from the truck.

When an abnormality occurs in magnets while the magnetically levitated vehicle is cruising at high speed, magnets will instantaneously lose its magnetic force, so that the abnormalized section will drop. At the same time, the vehicle will be pushed against the guideway side wall by magnets on the opposite side. To protect the vehicle in such an event the stopper ring will be in contact to the side wall, and guide the vehicle laterally to rest.

Figure 12:
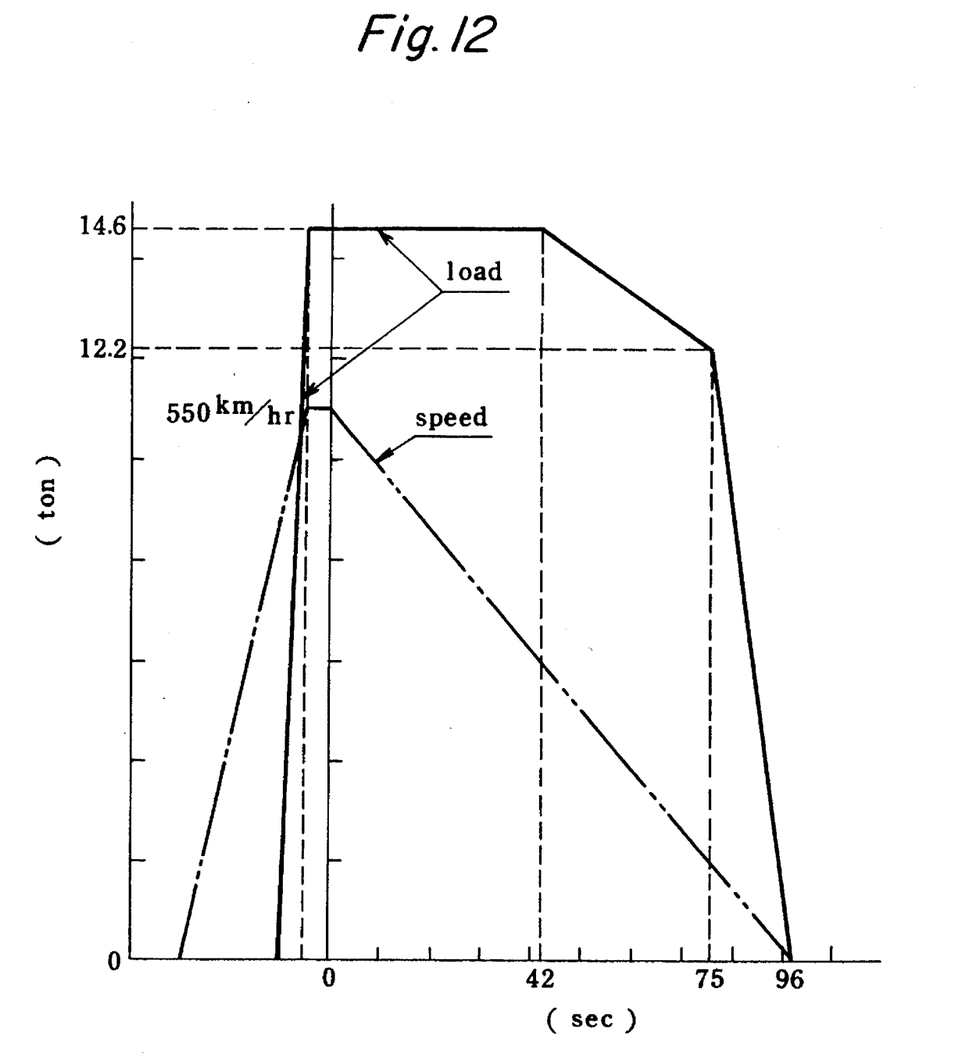
FIG. 12 is a graph to describe relationships among the load, speed and time.

FIG. 12 shows relationships between load and time, and changes in speed as a function of time when the wheel inclines with 2 degrees with the load of 14.6 tons from the vehicle running at a speed of 550 km/h and brought to rest in 92 seconds. This invented stopper ring apparatus with the aforementioned structure demonstrates that it withstands both the high speed and high load. Furthermore, when the vehicle is subjected to the load of 14.6 tons at the speed of 550 km/h (namely, 9,850 rpm), for 92 seconds, this stopper ring apparatus will exhibit the high speed and high load tolerance operating characteristics without seizing, which was not achieved by the conventional type of the stopper ring apparatus.

Accordingly, the support leg apparatus and the guide leg apparatus of this invention consists of only a fork arm to pivotally support the wheel and a lever arm to axially support the lifting actuator, so that it requires an extremely small amount of materials for the hanger components. It is, hence, a light weight structure and easy to maintain. It can be used both as a supporting leg and a guideway leg which contacts the guideway side wall. If all bearing components are structured with lubricant-free shaft system, said apparatus can be made as a maintenance-free structure.

Since the wheel can be retracted and stored by only pushing the lever of the lifting actuator, it is advantageous that a storage area in the vehicle can be minimized. Also, a damper being serially arranged in the lifting actuator performs an excellent shock absorbing capability.

Furthermore, there is a small number of installation places to the truck body, and installing and replacing parts can be done easily. Since metal bellows are utilized to protect piston rods of the lifting actuator and the damper, degradation due to weather elements and damages of the functional part caused by foreign objects can be prevented, and the performance reliability will be enhanced.

With the guide leg apparatus, according to this invention, the stopper rings are placed separately; namely, one side of the lever consists of a fork arm to support axially the wheel and the other side of the lever forms a lifting actuator axially connected thereto. Hence an extremely small amount of the materials for hanger components is required and therefore the apparatus can be a simple structure. Moreover, since the stopper ring is placed separately, it will only receive the lateral guide force (about 400 kg) of the normally cruising vehicle and will not require to consider about a large load in time of emergency. As a result, the whole apparatus can be lighter weight and the storage place in the truck can be made as small as possible, and the maintenance can be simplified.

While the vehicle is cruising at high speed, the guide leg can be completely retracted and stored inside the truck. Since the parts projected from the vehicle is decreased, it results in the lowering of the running resistance and reduction in running noise as well.

The stopper ring apparatus is projected at required places of the vehicle so that the emergency operation is secured. Since said apparatus is fixed to a bracket through the vibroisolating material and bearing are placed effectively to assure a free rotation of the apparatus, the shock generated in cases when it is in contact with the guide rail will be buffered. Moreover, the apparatus will rotate smoothly to withstand the high load caused from the high speed cruising vehicle.

While this invention has been described in detail with respect to preferred embodiment and examples, it should be understood that the invention is not limited to that precise embodiments; rather many modifications, and variations would present themselves to those of skill in the art without departing from the scope and spirit of this invention, as defined in the appended claims.

What is claimed is:

1. A leg apparatus for adjustably connecting a wheel to a bracket on a magnetically levitated vehicle, said leg apparatus comprising:

a generally L-shaped lever that provides a fork arm to which said wheel is axially connected and a lever arm, said lever being pivotally connected to said bracket where said fork arm and said lever arm merge, and an expandable lifting actuator connected between said lever arm of said lever and said vehicle to pivot said lever and said wheel about said bracket and move said wheel from a storage position to a use position, said expandable lifting actuator including a barrel which is connected to said vehicle, a piston cylinder that includes a damper cylinder and a lifting rod which extends into said barrel, a damper rod which is connected to said lever arm and extends into said damper cylinder, and an internal lock mechanism.

2. The leg apparatus according to claim 1, including a measuring rod supported by said damper cylinder and said barrel to indicate the relative positioning of said damper cylinder relative to said barrel.

3. The leg apparatus according to claim 1, wherein said internal lock mechanism is located within said barrel, and including a lock inspecting meter on said barrel to indicate an operational condition of said internal lock mechanism therein.

4. A leg apparatus according to claim 1, including attachment means at a free end of the fork arm remote from the lever arm for attachment of said wheel.

5. A guide apparatus for a magnetically levitated vehicle which includes first and second brackets and magnets thereon, comprising a generally L-shaped lever that provides a fork arm to which a wheel is axially connected and a lever arm, said lever being pivotally connected to said bracket where said fork arm and said lever arm merge, an expandable lifting actuator connected between said lever arm of said lever and said vehicle to pivot said lever and said wheel about said first bracket and move said wheel from a storage position to a use position, said expandable lifting actuator including an internal lock mechanism and serially arranged damping means, a stopper ring means which guides the vehicle along a guideway side wall when a malfunction of the magnets mounted on the vehicle or a malfunction of said leg apparatus occurs.

6. The guide apparatus according to claim 5, wherein said stopper ring means includes a stopper ring having a center shaft, said stopper ring being rotatably mounted on said second bracket to project from said vehicle, a plurality of a ball bearings around said center shaft, a vibroisolation material between said ball bearings and said second bracket, and incline step tabs to control inclination of said shaft relative to said second bracket.

\* \* \* \* \*